United States Patent [19]
Kakuta et al.

[11] Patent Number: 6,037,051
[45] Date of Patent: Mar. 14, 2000

[54] MAGNETIC TAPE

[75] Inventors: Takeshi Kakuta; Hiroaki Doushita; Hiroaki Araki, all of Kanagawa, Japan

[73] Assignee: Fuji Photo Film Co., Ltd., Kanagawa, Japan

[21] Appl. No.: 09/052,161

[22] Filed: Mar. 31, 1998

[30] Foreign Application Priority Data

Mar. 31, 1997 [JP] Japan ..................................... 9-079718

[51] Int. Cl.⁷ ............................ G11B 5/706; G11B 5/708
[52] U.S. Cl. .................. 428/328; 428/329; 428/694 BA; 428/694.13 BN; 428/900
[58] Field of Search ..................................... 428/328, 329, 428/694 BR, 694 BN, 900

[56] References Cited

U.S. PATENT DOCUMENTS

| | | | |
|---|---|---|---|
| 4,671,993 | 6/1987 | Kadokura et al. ....................... | 428/323 |
| 5,000,983 | 3/1991 | Iida et al. ................................ | 427/130 |
| 5,141,807 | 8/1992 | Umezaki et al. ........................ | 428/329 |
| 5,456,977 | 10/1995 | Ejiri et al. ............................... | 428/328 |
| 5,527,603 | 6/1996 | Isobe et al. .............................. | 428/323 |
| 5,534,361 | 7/1996 | Hisano et al. ..................... | 428/694 RE |
| 5,637,390 | 6/1997 | Isobe et al. .............................. | 428/323 |

*Primary Examiner*—Stevan A. Resan
*Attorney, Agent, or Firm*—Sughrue, Mion, Zinn, Macpeak & Seas, PLLC

[57] ABSTRACT

The present invention discloses a magnetic tape for use in a magnetic recording/reproduction system having a relative speed of 15 m/s or more between a tape and a head for recording and reproducing the tape; the magnetic tape having at least one magnetic layer provided on a nonmagnetic support, the magnetic layer comprising an Al-containing ferromagnetic powder and alumina dispersed in a binder, and a backcoat layer provided on the surface of the nonmagnetic support opposite to the magnetic layer, wherein the intensity ratio between Al and Fe (Al/Fe), as measured by ESCA, in the surface of the magnetic layer is 0.15 to 0.25. The use of this magnetic tape enables improved electromagnetic characteristics and durability to be achieved at a high recording density and a high transfer speed.

20 Claims, No Drawings

MAGNETIC TAPE

The present invention relates to a magnetic tape for use in a magnetic recording/reproduction system with a relative speed of 15 m/s or more between a tape and a head for recording and reproducing the tape. More specifically, the invention relates to a magnetic tape having improved electromagnetic characteristics and running durability at a high recording density and a high transfer speed.

A magnetic tape having a magnetic layer, which comprises a ferromagnetic powder dispersed in a binder, on a nonmagnetic support is widely used as a magnetic recording medium for audio equipment, video units, or computers.

To provide a high output magnetic tape, it is necessary to increase the maximum magnetic flux density (Bm) of a magnetic layer by reducing particle size of the ferromagnetic powder, and make the surface of the magnetic layer even smoother. However, when the magnetic layer is smoothed, its kinetic friction coefficient increases, thus making it likely for a tape running failure to happen.

To reduce the kinetic friction coefficient without impairing smoothness, therefore, it has been customary practice to add carbon black or a lubricant to the magnetic layer. The use of much carbon black, however, lowers the maximum magnetic flux density (Bm) of the magnetic layer. This is undesirable for electromagnetic characteristics. The use of a large amount of a lubricant such as a fatty acid or an ester thereof also results in the plasticization of the magnetic layer, lowering its durability.

To enable transfer at a high speed, there is need to increase the relative speed between the head for recording and reproducing signals and the magnetic tape. The increase in the relative speed, however, causes the head and the magnetic tape to slide at a high speed, makes them susceptible to damages such as the scraping of the surface of the magnetic tape. The resulting scrapings stick to the head gap, forming baked dirt on the head, which becomes the cause of a decreased output due to a spacing loss. To permit fast transfer, therefore, a magnetic tape with higher durability should be developed.

Among methods of enhancing durability by increasing the surface strength of a magnetic tape is the addition of an abrasive to the magnetic layer. This method has the advantages of not only increasing the surface strength of the magnetic tape, but also improving cleaning effect of removing the bonded matter on the head surface by a slide between the magnetic tape and the head. To impart strength capable of fully withstanding a high-speed running, however, it is necessary to use the abrasive in a large amount. The use of much abrasive not only lowers the maximum magnetic flux density (Bm) of the magnetic layer to deteriorate electromagnetic characteristics, but also wears the head excessively to shorten the life of the head. To deal with this problem, studies are under way to optimize the amount of addition, size, hardness and shape of the abrasive used, but no full achievements have been accomplished.

Under these circumstances, the present invention has set it as a challenge to realize the provision of a magnetic tape which solves the foregoing problems with conventional technologies and which can be used in a magnetic recording/reproduction system having a high recording density and a high transfer speed. That is, the object of the invention is to provide a novel magnetic tape showing improved electromagnetic characteristics and durability as well as reduced head wear, at a high recording density and a high transfer speed.

To attain this object, we, the inventors, have conducted extensive studies on the composition of the surface of a magnetic layer. As a result, we have found that a magnetic tape having an Al/Fe intensity ratio of the magnetic layer surface falling within a specific range shows improved electromagnetic characteristics and durability at a high recording density and a high transfer speed. This finding has led us to accomplish the present invention.

That is, the invention provides a magnetic tape having at least one magnetic layer provided on a nonmagnetic support, the magnetic layer comprising an Al-containing ferromagnetic powder and alumina dispersed in a binder, and a backcoat layer provided on the opposite surface of the support, wherein the Al/Fe intensity ratio measured by ESCA is 0.15 to 0.25. The magnetic tape of the invention is used in a system in which the relative speed between the tape and a head for recording and reproducing the tape is 15 m/s or more.

The Al/Fe intensity ratio measured by ESCA corresponds to the mol ratio of Al and Fe present on the magnetic layer surface of the magnetic tape. The influence of the Al/Fe intensity ratio on the electromagnetic characteristics and durability of a magnetic tape at a high recording density and a high transfer speed has not been clarified. Our analysis of conventional magnetic tapes for high recording density, high transfer speed recording/reproduction has shown that the Al/Fe intensity ratio in most of these tapes is about 0.03–0.10, and none of the tapes provided have a high intensity ratio of 0.15 or more. Thus, we have prepared magnetic tapes having a wide range of the Al/Fe intensity ratio including 0.15 or more, and compared their characteristics under high recording density, high transfer speed conditions. To our surprise, we have found that magnetic tapes having an Al/Fe intensity ratio of 0.15 to 0.25, which have not been studied at all, possess superb electromagnetic characteristics and durability. This fact was utterly unpredictable from the level of conventional technologies that have not elucidated the relationship between the intensity ratio and the characteristics.

A magnetic tape having an Al/Fe intensity ratio of 0.15 to 0.25 has a kinetic friction coefficient and magnetic layer surface strength which are suitable for use at a high recording density and a high transfer speed. Thus, this tape is advantageous in exhibiting a moderate cleaning action, and being very high in running durability during repeated use. A magnetic tape having an Al/Fe intensity ratio of less than 0.15 is so low in the kinetic friction coefficient against the head that it cannot clean the head sufficiently. Also, the strength of its magnetic layer surface is too low to show sufficient durability. A magnetic tape having an Al/Fe intensity ratio of more than 0.25, on the other hand, exerts so high an abrasive force on the head that the head is excessively worn. The continued use of such a magnetic tape having an Al/Fe intensity ratio of more than 0.25 leads to a short life of the head. A magnetic tape having an Al/Fe intensity ratio of 0.15–0.25 has no such drawbacks, and exhibits a very satisfactory action, since its kinetic friction coefficient with the head and its magnetic layer surface strength are both in appropriate ranges.

The Al/Fe intensity ratio of the magnetic layer surface is measured by ESCA (Electron Spectroscopy for Chemical Analysis). In detail, the Al/Fe intensity ratio can be obtained by irradiating the magnetic layer surface with X rays, spectroscopically analyzing photoelectrons released from the magnetic layer surface by means of a photoelectron energy measuring instrument, and calculating the area intensity ratio between the 2s peak of Al and the $2s^{3/2}$ peak of Fe (Al/Fe). The value of the Al/Fe intensity ratio described in the instant specification is the result obtained by irradiating the magnetic layer surface of a magnetic tape with X rays at 300 W, 15 kV and 100 eV by the use of an Mg anode, and measuring photoelectrons with a photoelectron energy measuring instrument (phi-560; made by Φ Co.).

The Al/Fe intensity ratio can be adjusted within the range of from 0.15 to 0.25 by combining a plurality of factors. The most influential factor is the Al content of the ferromagnetic powder for use in the magnetic layer. The higher the Al content of the ferromagnetic powder, the higher the Al/Fe intensity ratio. The lower the Al content of the ferromagnetic powder, the lower the Al/Fe intensity ratio. The preferred Al content for producing the magnetic tape of the present invention is selected from the range of from 6 to 13 atomic %, more preferably from 7 to 12 atomic %, most preferably from 8 to 11.5 atomic %, based on Fe.

The Al/Fe intensity ratio can be adjusted by varying the particle size or the amount of use of alumina contained as an abrasive in the magnetic layer. As the particle size of alumina is decreased, the Al/Fe intensity ratio increases. When the amount of alumina used is increased, the Al/Fe intensity ratio also increases. These factors are preferably used to finely adjust the Al/Fe intensity ratio after roughly setting the Al/Fe intensity ratio by determining the Al content of the ferromagnetic powder. However, the use of alumina with an excessively large particle size, or too large an amount of alumina used is not preferred, because output decreases or the head wears violently.

The particle size and the amount of use of alumina should preferably be determined appropriately within a range employed for an ordinary magnetic tape so that a decrease in output or head abrasion will not occur excessively. The average particle size of alumina is preferably 0.05 to 0.5 $\mu$m, more preferably 0.1 to 0.3 $\mu$m. The use of alumina used is preferably 6 to 20 parts by weight, more preferably 9 to 16 parts by weight, per 100 parts by weight of the ferromagnetic powder.

The Al/Fe intensity ratio can also be adjusted by burnishing the surface of the magnetic layer after preparation of the magnetic layer. The burnishing lowers the Al/Fe intensity ratio. The magnetic tape of the invention is preferably a burnished one. The burnishing can be carried out by a method usually performed when a magnetic tape is produced. For example, burnishing can be performed by applying a rigid material such as sapphire blade, a razor blade, a superhard material blade, a diamond wheel or a ceramic blade, and causing the magnetic tape to run in contact with the rigid material. The rigid material in touch with the magnetic tape may be square or round in shape, or a wheel-shaped type having the rigid material provided on the circumference of a rotating cylindrical body. Alternatively, burnishing may be performed by interposing a lapping tape between the blade and the magnetic tape, and causing the two tapes to run in opposite directions. The lapping tape used here may be an abrasive tape in customary use for burnishing. For instance, K10000 (a product of Fuji Photo Film) can be used. The detailed process of the burnishing is described in, for example, U.S. Pat. No.5,000,983.

After burnishing is performed, it is common practice to do wiping in the customary manner for removing dirt on the surface of the magnetic tape. Wiping is preferably applied not only to the surface of the magnetic layer, but also to the back surface and the edge end face. Wiping can be done using various types of Vilene (Japan Vilene Company Ltd.), Toraysee, Ecsaine, Kimwipe (TORAY INDUSTRIES, INC.), nylon nonwoven fabric, polyester nonwoven fabric, acrylonitrile nonwoven fabric, blended yarn nonwoven fabric, or tissue paper.

The materials for use in the magnetic tape of the invention will be described below.

For the magnetic layer of the magnetic tape of the invention, there is used a ferromagnetic alloy powder consisting mainly of Fe and containing Al. Fe preferably accounts for 60 atomic % or more of the ferromagnetic powder, while the Al content is preferably in the range described in relation to the above-mentioned Al/Fe intensity ratio adjusting methods. The ferromagnetic powder preferably contains a lanthanide series metallic element such as Nd, Sm, Dy, Gd, Tb, La, Ce or Pr, or other rare earth element such as Y or Sc. The content of the rare earth element is preferably 1.0 to 10 atomic % based on Fe. The ferromagnetic powder may contain, in addition to these substances, atoms such as Si, S, Ti, V, Cr, Cu, Mo, Rh, Pd, Ag, Sn, Sb, Te, Ba, Ta, W, Re, Au, Hg, Pb, Bi, P, Co, Mn, Zn, Ni, Sr or B.

The σs of the ferromagnetic powder used in the invention is preferably 110 to 160 emu/g. If the σs is smaller than 100 emu/g, the electromagnetic characteristics including reproduction output will decline. If the σs exceeds 160 emu/g, the dispersibility of magnetic particles lowers to roughen the surface of the magnetic layer. Thus, a decrease in reproduction output is induced.

The average major axis length of the ferromagnetic powder used in the invention is 0.06 to 0.2 $\mu$m, and preferably 0.06 to 0.18 $\mu$m. The average major axis length shorter than 0.06$\mu$m makes it difficult to obtain sufficient coercive force. If it is longer than 0.2 $\mu$m, on the other hand, there arises the difficulty in obtaining sufficient reproduction output, when the recording wavelength is short.

The crystallite size of the ferromagnetic powder used in the invention is 100 to 250 angstroms, and preferably 100 to 200 angstroms. If the crystallite size of the ferromagnetic powder is smaller than 100 angstroms, sufficient σs cannot be exhibited. If it is larger than 250 angstroms, reproduction output declines.

The ferromagnetic powder used in the invention may contain a small amount of a hydroxide or an oxide.

According to the invention, a ferromagnetic powder prepared by a publicly known manufacturing method can be used. For example, a ferromagnetic powder produced by the method described in U.S. Pat. No. 5,534,361 is usable. The ferromagnetic powder prepared by any such method that has been subjected to a publicly known slow oxidation treatment method can also be used in the present invention. The available method in the invention is a method of dipping the powder in an organic solvent and then drying it; a method of dipping the powder in an organic solvent, and then feeding an oxygen-containing gas to form an oxide film on the surface of the powder, followed by drying; or a method of adjusting the partial pressures of an oxygen gas and an inert gas without using an organic solvent, thereby forming an oxide film on the surface of the powder. Of the ferromagnetic powders produced by these methods, the ferromagnetic powder slowly oxidized in a gaseous phase without the use of an organic solvent is excellent in weather resistance and preferred.

The ferromagnetic powder used in the invention is preferably one having a specific surface area, as measured by the BET method, of 40 to 70 $m^2/g$. The use of a ferromagnetic powder with a specific surface area of less than 40 $m^2/g$ causes a loud noise. A ferromagnetic powder with a specific surface area in excess of 70 $m^2/g$ poses difficulty in preparing a smooth surface. Neither type is preferred.

The moisture content of the ferromagnetic powder used in the invention is preferably 0.01 to 2%. The moisture content of the ferromagnetic powder is preferably optimized depending on the type of a binder used. The tap density is preferably 0.3 to 1.5 g/ml or more, and more preferably 0.5 to 1.2 g/ml or above.

The pH of the ferromagnetic powder used in the invention is preferably optimized depending on a combination with the binder used. The preferred pH of the ferromagnetic powder is 7 to 12.

The ferromagnetic powder used in the invention may contain soluble inorganic ions such as K, Na, Ca, Fe, Ni or Sr. The total amount of these inorganic ions is preferably 500 ppm or less, and more preferably 200 ppm or less. The amount in excess of 500 ppm may result in the precipitation of a fatty acid metal salt upon reaction with a higher fatty acid in the magnetic layer. This precipitation may lead to a spacing loss, which is an undesirable phenomenon.

The ferromagnetic powder used in the invention preferably has fewer voids. The voids preferably account for not more than 20 volume %, more preferably not more than 5 volume %, of the ferromagnetic powder. The shape of the ferromagnetic powder is preferably an acicular form which satisfies the aforementioned characteristics related to the particle size, and the acicularity ratio is preferably 12 or less. The Hc distribution of the ferromagnetic powder is preferably narrow. Among methods for narrowing the Hc distribution are a method of improving the particle size distribution of goethite, and a method of preventing the sintering of $\gamma$-hematite. The SFD of a magnetic tape using such a ferromagnetic powder is preferably 0.1 to 0.6.

The magnetic layer of the invention necessarily contains alumina as an abrasive. The type of alumina used in the invention is not restricted, and alumina in common use for a magnetic tape, such as $\alpha$-alumina or $\beta$-alumina, can be used. When $\alpha$-alumina is used, the $\alpha$-conversion rate is preferably 90% or higher. In the present invention, it is preferred to use alumina described in U.S. Pat. No. 5,141,807.

For the magnetic layer of the invention, publicly known materials mainly with a Mohs' scale of hardness of 6 or higher, such as silicon carbide, chromium oxide, cerium oxide, corundum, artificial diamond, silicon nitride, titanium carbide, titanium oxide, silicon dioxide, and boron nitride, may also be used alone or in combination, in addition to alumina. A composite of these abrasives, i.e., each abrasive surface-treated with one another abrasive can be used. These abrasives may contain a compound or an element other than the active ingredient, but the effect obtained is unchanged when the proportion of the active ingredient is 90% or more. The average particle size of the abrasive is 0.05 to 0.5 $\mu$m, preferably 0.1 to 0.3 $\mu$m. When the average particle size is within the range of 0.05 to 0.5 $\mu$m, two or more of the abrasives with different particle sizes may be combined where necessary, or one abrasive with a broad particle size distribution may be used. The abrasive used in the invention preferably has a tap density of 0.3 to 2 g/ml, a moisture content of 0.1 to 5%, pH of 2 to 11, and a specific surface area of 1 to 30 $m^2/g$. The shape of the abrasive used in the invention may be acicular, spherical or dice-like, but preferably has a corner in its part such as described in U.S. Pat. No. 4,671,993, because a higher abrasive power will develop. Examples of the abrasive used in the invention are AKP-50, HIT-50, HIT-55, HIT-60 and HIT-70 (made by SUMITOMO CHEMICAL CO., LTD.), S7 and S-1 (Nippon Chemical Industrial Co., Ltd.), and 100ED and 140ED (TODA KOGYO CORP.).

In preparing the magnetic tape of the invention, the abrasive may be dispersed in a binder before being added to a magnetic paint. The number of the abrasive particles present on the surface and end face of the magnetic layer of the magnetic tape is 5 to 130/100 $\mu m^2$, preferably 5 to 90/100 $\mu m^2$.

The magnetic layer of the magnetic tape according to the invention preferably contains carbon black with an average particle size of 20 to 100 nm. If the average particle size of carbon black is smaller than 20 nm, the kinetic friction coefficient tends to increase. This is not preferred. With the average particle size of larger than 100 nm, the surface properties are apt to deteriorate, and a decline in electromagnetic characteristics or a spacing loss may easily occur.

As the carbon black for use in the magnetic layer, furnace black for rubber, thermal black for rubber, black for color, or acetylene black can be exemplified. The average primary particle size of carbon black is 20 to 100 nm. The carbon black preferably has a specific surface area of 5 to 500 $m^2/g$, a DBP oil absorption of 10 to 400 ml/100 g, pH of 2 to 10, a moisture content of 0.1 to 10%, and a tap density of 0.1 to 1 g/ml. It is also possible to use carbon black which has been surface treated with a dispersant or grafted with a resin, or carbon black whose surface has been partly graphitized.

Any of these carbon blacks may be dispersed in a binder before it is added to a magnetic paint. These carbon blacks may be used alone or in combination. The amount of carbon black used is preferably 0.1 to 30% of the ferromagnetic powder. Carbon black is effective in reducing the kinetic friction coefficient of the magnetic layer, and carbon black having the action of imparting light screening properties or improving film strength may be concomitantly used. Moreover, carbon black having a smaller particle size than the aforementioned particle size range can be used jointly according to the purpose to be attained.

Carbon black for use in the magnetic layer of the invention can be decided on by reference to, say, "A Handbook of Carbon Black" edited by the Carbon Black Association.

The binder used in the magnetic layer and the nonmagnetic layer of the invention may include, for example, publicly known thermoplastic resins, thermosetting resins, reactive resins and mixtures of these resins.

The thermoplastic resin usable in the invention may be, for example, a thermoplastic resin having a glass transition temperature of $-100$ to 150° C., a number average molecular weight of 1,000 to 200,000, preferably 10,000 to 100,000, and a degree of polymerization of about 50 to 1,000.

Examples of the thermoplastic resin are polymers or copolymers containing, as the building block, vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal, or vinyl ether, polyurethane resins, and various rubber resins.

Examples of the thermosetting resin or the reactive resin are phenolic resins, epoxy resins, curable polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyester polyols and polyisocyanates, and mixtures of polyurethanes and polyisocyanates.

A detailed description of these resins is offered in "A Handbook of Plastics" published by Asakura Shoten Bookstore. A publicly known radiation curing type resin can also be used for the nonmagnetic layer or the magnetic layer.

These resins may be used alone or in combination. Preferred examples of the resins are combinations of polyurethanes and at least one resin selected from the group consisting of vinyl chloride resins, vinyl chloride-vinyl acetate resins, vinyl chloride-vinyl acetate-vinyl alcohol resins, and vinyl chloride-vinyl acetate-maleic anhydride copolymers; and combinations of these resins with polyisocyanates.

As the polyurethane resins, publicly known ones can be exemplified, such as polyester polyurethane, polyether polyurethane, polyether polyester polyurethane, polycarbonate polyurethane, polyester polycarbonate polyurethane, and polycaprolactone polyurethane.

To obtain better dispersibility and durability, it is preferred that at least one polar group selected from COOM, $SO_3M$, $OSO_3M$, $P=O$, $(OM)_2$, $O—P=O(OM)_2$ (where M represents a hydrogen atom or an alkali metal salt group), OH, $NR_2$, $N^+R_3$ (where R represents a hydrocarbon group), an epoxy group, SH and CN be introduced, where necessary, into the binder by copolymerization or an addition reaction. The amount of the polar group is $10^{-1}$ to $10^{-8}$ mol/g, preferably $10^{-2}$ to $10^{-6}$ mol/g.

Examples of the binder used in the invention are VAGH, VYHH, VMCH, VAGF, VAGD, VROH, VYES, VYNC, VMCC, XYHL, XYSG, PKHH, PKHJ, PKHC and PKFE (made by Union Carbide Corp.), MPR-TA, MPR-TA5, MPR-TAL, MPR-TSN, MPR-TMF, MPR-TS and MPR-TM (made by Nisshin Kagaku Kogyo Co.), 1000W, DX80, DX81, DX82 and DX83 (made by DENKI KAGAKU KOGYO K. K.), MR110, MR100 and 400X-110A (made by Nippon Zeon, Co., Ltd.), Nipporan N2301, N2302 and N2304 (made by Nippon Polyurethane Industry Co., Ltd.), Pandex T-5105, T-R3080 and T-5201, Burnock D-400 and D-210-80, and Krisvon 6109 and 7209 (made by DAINIPPON INK & CHEMICALS, INC.), Vylon UR8200, UR8300, RV530, RV280, UR8600 and UR-5500 (made by TOYOBO CO., LTD.), Daiferamine 4020, 5020, 5100, 5300, 9020, 9022 and 7020 (made by DAINICHISEIKA COLOUR & CHEMICALS MFG. CO., LTD.), MX5004 (made by Mitsubishi Chemical Corp.), Sunprene SP-150 (made by SANYO CHEMICAL INDUSTRIES, LTD.), and Saran F310 and F210 (made by ASAHI CHEMICAL INDUSTRY CO., LTD.).

The amount of the binder used in the magnetic layer of the invention is preferably within the range of 5 to 50% by weight, and more preferably within the range of 10 to 30% by weight, based on the ferromagnetic powder contained in the magnetic layer. When vinyl chloride resin, polyurethane resin and polyisocyanate are combined, it is preferred to use the vinyl chloride resin in the range of 5 to 30% by weight, the polyurethane resin in the range of 2 to 20% by weight, and the polyisocyanate in the range of 2 to 20% by weight.

Examples of the polyisocyanate used in the invention are isocyanates such as tolylene diisocyanate, 4,4'-diphenylmethane diisocyanate, hexamethylene diisocyanate, xylene diisocyanate, naphthylene-1,5-diisocyanate, o-toluidine diisocyanate, isophorone diisocyanate, and triphenylmethane triisocyanate, the products formed by the reaction between these isocyanates and polyalcohols, and polyisocyanates produced by the condensation of isocyanates. Concrete examples of these isocyanates are Colonate L, Colonate HL, Colonate 2030, Colonate 2031, Millionate MR and Millionate MTL (made by Nippon Polyurethane Industry Co., Ltd.), Takenate D-102, Takenate D-110N, Takenate D-200 and Takenate D-202 (made by Takeda Chemical Industries, Ltd.), and Desmodule L, Desmodule IL, Desmodule N and Desmodule HL (made by Sumitomo Bayer Co.). These may be used alone, or in combination of two or more with their difference in curing reactivity being utilized.

The magnetic layer of the magnetic tape of the invention preferably contains a higher fatty acid for improving the running durability of the magnetic tape. The higher fatty acid used for the magnetic layer is mainly a basic fatty acid with a carbon number of 10 to 26, which may be a saturated or unsaturated one, or may be a straight-chain or branched one. The carbon to which the carboxyl group is bonded may be primary, secondary or tertiary. As examples of the higher fatty acid, lauric acid, palmitic acid, myristic acid, stearic acid, behenic acid, oleic acid, linolenic acid and elaidic acid can be quoted. The amount of the higher fatty acid added is 0.1 to 20% by weight, preferably 0.1 to 10% by weight, more preferably 0.1 to 5% by weight, based on the ferromagnetic powder.

For the magnetic tape of the invention, additives such as dispersants, lubricants, antistatic agents, surfactants, and plasticizers can be used according to the object to be achieved. As additives, those having a lubricating effect, an antistatic effect, a dispersing effect, or a plasticizing effect are used. Examples of the additives are molybdenum disulfide, tungsten graphite disulfide, boron nitride, graphite fluoride, silicone oils, silicones having a polar group, fatty acid modified silicones, fluorine-containing silicones, fluorine-containing alcohols, fluorine-containing esters, polyolefins, polyglycols, alkyl phosphoric esters and their alkali metal salts, alkyl sulfuric esters and their alkali metal salts, polyphenyl ethers, fluorine-containing alkyl sulfuric esters and their alkali metal salts, monohydric, dihydric, trihydric, tetrahydric, pentahydric, and hexahydric alcohols having a carbon number of 12 to 22 (optionally containing an unsaturated bond, or being branched), alkoxyalcohols having a carbon number of 12 to 22, monofatty acid esters or difatty acid esters or trifatty acid esters comprising any one of monohydric, dihydric, trihydric, tetrahydric, pentahydric, and hexahydric alcohols having a carbon number of 2 to 12 (optionally containing an unsaturated bond, or being branched), fatty acid esters of monoalkyl ethers of alkylene oxide polymerizates, fatty acid amides having a carbon number of 8 to 22, aliphatic amines having a carbon number of 8 to 22, and fatty acid esters formed between fatty acids having a carbon number of 10 to 24 and alcohols (optionally containing an unsaturated bond, or being branched).

Concrete examples of the above compounds are stearic acid amide, myristic acid amide, butyl stearate, oleyl oleate, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol. Other examples are nonionic surfactants such as alkylene oxide derived compounds, glycerin derived compounds, glycidol derived compounds, or alkylphenolethylene oxide adducts; cationic surfactants such as cyclic amines, ester amides, quaternary ammonium salts, hydantoin derivatives, heterocyclic compounds, phosphonium compounds or sulfonium compounds; anionic surfactants containing an acidic group such as carboxylic acid group, sulfonic acid group, phosphoric acid group, sulfuric ester group, or phosphoric ester group; and amphoteric surfactants such as amino acids, aminosulfonic acids, sulfuric or phosphoric esters of aminoalcohols, or alkylbetaine type compounds. These surfactants are described in detail in "A Guide to Surfactants" (published by Sangyo Tosho Co.). These additives such as dispersants, lubricants, antistatic agents, surfactants and plasticizers need not be 100% pure, but may contain impure components, such as isomers, unreacted substances, side reaction products, degradation products, or oxides, in addition to the main ingredient. The content of each of these impurities is preferably 30% by weight or less, and more preferably 10% by weight or less.

All or some of the additives used in the invention may be added at any stage of the manufacturing process for the magnetic paint. For instance, they may be mixed with the ferromagnetic powder before a kneading step; or added at a kneading step for kneading the ferromagnetic powder and the binder together with a solvent; or added at a dispersing step; or added after dispersing; or added immediately before coating. Concrete examples of the lubricant used in the invention are NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hydrogenated castor oil fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl laurate, and erucic acid (made by NOF Corp.), oleic acid (made by Kanto chemical Co., Ltd.) FAL-205 and FAL-123 (made by Takemoto Oil and Fat Co., Ltd.), Enujerubu LO, Enujerubu IPM, and Sansosyzer E4030 (made by New Japanese chemical Co., Ltd.), TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910, and KF-3935 (made by Shin-Etsu Chemical Co., Ltd.), Armaid P, Armaid C, and Armoslip CP (made by Lion Armour Co.), Duomine TDO made by Lion Corp., BA-41G made by THE NISSHIN OIL MILLS, LTD., Profan 2012E, Newpole PE61, Ionet MS-400, Ionet MO-200, Ionet DL-200, Ionet DS-300, Ionet DS-1000, and Ionet DO-200 (made by SANYO CHEMICAL INDUSTRIES, LTD.).

Examples of the organic solvent for use in the invention are ketones such as acetone, methyl ethyl ketone, methyl isobutyl ketone, diisobutyl ketone, cyclohexanone, isophorone, or tetrahydrofuran; alcohols such as methanol, ethanol, propanol, butanol, isobutyl alcohol, isopropyl alcohol, or methylcyclohexanol; esters such as methyl acetate, butyl acetate, isobutyl acetate, isopropyl acetate, ethyl lactate or glycol acetate; glycol ethers such as glycol dimethyl ether, glycol monoethyl ether, or dioxane; aromatic hydrocarbons such as benzene, toluene, xylene, cresol or chlorobenzene; chlorinated hydrocarbons such as methylene chloride, ethylene chloride, carbon tetrachloride, chloroform, ethylene chlorohydrin, or dichlorobenzene; N,N-dimethylformamide, and hexane. These organic solvents may be used in arbitrary proportions. These organic solvents need not be 100% pure, but may contain impure components, such as isomers, unreacted substances, side reaction products, degradation products, oxides or moisture, in addition to the main ingredient. The content of each of these impurities is preferably 30% by weight or less, and more preferably 10% by weight or less.

The thickness of the nonmagnetic support used in the magnetic tape of the invention is preferably 1 to 100 $\mu$m, and more preferably 4 to 20 $\mu$m. The thickness of the magnetic layer is 0.1 to 4.0 $\mu$m, preferably 0.1 to 3.5 $\mu$m. When the thickness of the magnetic layer is 0.1 to 0.8 $\mu$m, a nonmagnetic layer may be provided. Between the nonmagnetic support and the magnetic layer, an undercoat layer is preferably provided in order to improve adhesion. The thickness of the undercoat layer is 0.01 to 2 $\mu$m, preferably 0.05 to 0.5 $\mu$m. On the side of the nonmagnetic support opposite to the magnetic layer side, a backcoat layer is provided. The thickness of the backcoat layer is 0.1 to 2 $\mu$m, preferably 0.3 to 1.0 $\mu$m. The components for use in the undercoat layer and the backcoat layer may be publicly known ones.

As the nonmagnetic support used in the invention, there can be exemplified publicly known films of polyesters such as polyethylene terephthalate or polyethylene naphthalate, polyolefins, cellulose triacetate, polycarbonates, polyamides, polyimides, polyamideimides, polysulfones, aramids, and aromatic polyamides. These supports maybe subjected before hand to corona discharge treatment, plasma treatment, treatment for enhancing adhesion, heat treatment, or dust removal. The center line average surface roughness of the nonmagnetic support is preferably 0.001 to 0.03 $\mu$m, more preferably 0.001 to 0.02 $\mu$m, most preferably 0.001 to 0.01 $\mu$m. The nonmagnetic support preferably not only has small center line average surface roughness, but is also free from bulky protrusions measuring 1 $\mu$m or larger. The surface roughness can be controlled freely by the size and amount of a filler to be added, where necessary, to the support. Examples of the filler are oxides or carbonates of Ca, Si and Ti, as well as fine organic powders of polyester resins or acrylic resins. The F-5 value in the tape running direction of the nonmagnetic support used in the invention is preferably 5 to 50 kg/mm$^2$, while its F-5 value in the tape width direction is preferably 3 to 30 kg/mm$^2$. Generally, the F-5 value in the tape length direction is higher than the F-5 value in the tape width direction, but this is not the case particularly when the strength in the width direction needs to be increased.

The thermal shrinkage of the nonmagnetic support of the invention in the tape running direction and the tape width direction under the conditions 100° C. and 30 minutes is preferably 3% or less, more preferably 1.5% or less. Its thermal shrinkage upon treatment for 30 minutes at 80° C. is preferably 1% or less, more preferably 0.5% or less. Preferably, the break strength of the nonmagnetic support in either direction is 5 to 100 kg/mm$^2$, and its modulus of elasticity is 100 to 2,000 kg/mm$^2$.

The process for producing the magnetic paint that constitutes the magnetic layer of the magnetic tape according to the invention consists at least of a kneading step, a dispersing step, and a mixing step to be carried out, where necessary, before or after these steps. The individual step may be performed at two or more stages. All of the starting materials used in the invention, including the ferromagnetic powder, binder, carbon black, abrasive, antistatic agent, lubricant and solvent, may be added at the beginning of or during any of the steps. Furthermore, the individual starting material may be divided and added in two or more steps. For example, polyurethane may be divided and added in the kneading step, the dispersing step, and the mixing step for viscosity adjustment after dispersing.

The magnetic tape of the invention can be produced by a publicly known manufacturing technique for preparing a magnetic tape. The kneader may be an open kneader, a continuous kneader, or a pressure kneader. The ferromagnetic powder or nonmagnetic powder, and all or part of the binder (preferably, not less than 30% of the entire binder) are kneaded together with 15 to 500 parts by weight, per 100 parts by weight, of the ferromagnetic or nonmagnetic powder, of a solvent. Details of the kneading treatment are given in U.S. Pat. Nos.4,946,615 and 5,300,244.

Examples of the methods for providing the magnetic layer on the nonmagnetic support are gravure coating, roll coating, blade coating and extrusion coating which are generally used in the coating of a magnetic paint.

To provide a magnetic layer on the nonmagnetic support in the invention, it is preferred to use an extrusion coating device as disclosed in U.S. Pat. Nos.4,828,779; 4,717,603; 4,985,284; 5,114,753; 4,982,687; 5,119,757; 5,118,525 and 5,569,494.

When two or more magnetic layers are provided in the invention, the same procedure as described above is performed.

To produce the magnetic tape of the invention, it is necessary to orient the magnetic field of the magnetic layer strongly. For the orientation of the magnetic field, it is preferred to jointly use a solenoid of 1,000 G or more and a cobalt magnet of 2,000 G or more. It is also preferred to dry the magnetic layer moderately before orientation so that the orientation properties after drying will be the highest.

As a calender roll for orientation, there can be used a plastic roll having heat resistance which is formed from a plastic material such as epoxy, polyimide, polyamide or polyimideamide. Calendering can be carried out using metal rolls. The calendering temperature is preferably 70 to 150° C., and more preferably 80 to 150° C. The linear pressure is preferably 200 to 500 kg/cm, and more preferably 300 to 400 kg/cm.

The coefficient of kinetic friction (SUS420J) of the magnetic layer surface and the opposite surface thereto in the magnetic tape of the invention is preferably 0.5 or less, more preferably 0.3 or less. The surface resistivity is preferably $10^6$ to $10^{12}$ Ω/sq. The modulus of elasticity at 0.5% elongation of the magnetic layer is preferably 100 to 2,000 kg/mm$^2$ in both of the running direction and the width direction. The break strength is preferably 1 to 30 kg/cm$^2$. The modulus of elasticity of the magnetic tape is preferably 100 to 1,500 kg/mm$^2$ in both of the running direction and the width direction. The residual elongation is preferably 0.5% or less. The thermal shrinkage at every temperature lower than 100° C. is preferably 1% or less, more preferably 0.5% or less, most preferably 0.1% or less.

In the invention, the amount of the residual solvent contained in the magnetic layer and the nonmagnetic layer is preferably 100 mg/m$^2$ or less, more preferably 10 mg/m$^2$ or less.

In the invention, the void ratio that the magnetic layer and the nonmagnetic layer have is preferably 30% by volume or less, more preferably 10% by volume or less.

The magnetic characteristics of the magnetic tape according to the invention are as follows: The squareness ratio in the tape running direction when measured at a magnetic field of 5 kOe is preferably 0.70 or above, more preferably 0.80 or above, most preferably 0.90 or above. The squareness ratios in directions perpendicular to the tape running direction are preferably not more than 80% of the squareness ratio in the running direction. The SFD of the magnetic layer is preferably 0.6 or less.

The method of producing the magnetic tape of the invention will be described concretely with reference to Examples below to demonstrate the excellent electromagnetic characteristics and durability of this magnetic tape in comparison with Comparative Examples. The scope of the invention should not be construed as being limited by the following description.

<Production of magnetic tape>

The magnetic tapes of the invention (Examples 1 to 6) and control magnetic tapes (Comparative Examples 1 to 7) were produced in the following manner:

The constituents of Composition 1 described in Table 1 were kneaded in an open kneader. Then, Composition 2 was added, and the mixture was dispersed with a sand mill. Composition 3 was further added to prepare a coating solution for a magnetic layer. The type and amount of the ferromagnetic alloy powder in Composition 1, and the type and amount of α-alumina in Composition 2 were varied according to the Examples and Comparative Examples as listed in Tables 2 and 3.

TABLE 1

Formulation of Compositions 1 to 3 for preparation of magnetic layer

| Constituent | Parts by weight |
|---|---|
| Composition 1: | |
| Ferromagnetic alloy powder (see Table 2) | 100 |
| Carbon black (Black #50; made by Asahi Carbon Co.) | 1 |
| Vinyl chloride copolymer resin (MR110; made by Nippon Zeon Co., Ltd.) | 10 |
| Urethane resin (UR8300; made by TOYOBO CO., LTD.) | 4 |
| Cyclohexanone | 130 |
| Methyl ethyl ketone | 75 |
| Toluene | 50 |
| Composition 2: | |
| α-alumina (see Table 3) | See Table 3 |
| Methyl ethyl ketone | 5 |
| Composition 3: | |
| Polyisocyanate (Colonate; made by Nippon Polyurethane Industry Co. Ltd.) | 4 |
| Toluene | 30 |
| Stearic acid | 1 |
| Butoxyethyl stearate | 1 |
| Stearic acid amide | 0.5 |

TABLE 2

Type of ferromagnetic alloy powder

| No. | Al content (atom. %) | Major axis length (μm) | Hc (Oe) | σs (emu/g) |
|---|---|---|---|---|
| Comp. Ex. 1 | 15.2 | 0.10 | 1800 | 142 |
| Comp. Ex. 2 | 12.0 | 0.11 | 1800 | 145 |
| Comp. Ex. 3 | 15.2 | 0.11 | 1820 | 145 |
| Ex. 1 | 12.0 | 0.11 | 1800 | 145 |
| Ex. 2 | 10.7 | 0.11 | 1750 | 145 |
| Ex. 3 | 8.7 | 0.11 | 1680 | 145 |
| Ex. 4 | 8.7 | 0.11 | 1680 | 145 |
| Ex. 5 | 8.7 | 0.11 | 1680 | 145 |
| Ex. 6 | 8.7 | 0.11 | 1680 | 145 |
| Comp. Ex. 4 | 8.7 | 0.11 | 1680 | 145 |
| Comp. Ex. 5 | 6.5 | 0.11 | 1680 | 142 |
| Comp. Ex. 6 | 6.5 | 0.11 | 1680 | 142 |
| Comp. Ex. 7 | 6.5 | 0.11 | 1680 | 142 |

[Notes] The axial ratio for all examples is 1/6.

TABLE 3

Particle size and content of α-alumina

| No. | Average particle size (μm) | Parts by weight |
|---|---|---|
| Comp. Ex. 1 | 0.20 | 14 |
| Comp. Ex. 2 | 0.20 | 14 |
| Comp. Ex. 3 | 0.20 | 6 |
| Ex. 1 | 0.20 | 14 |
| Ex. 2 | 0.20 | 14 |
| Ex. 3 | 0.15 | 14 |

TABLE 3-continued

Particle size and content of α-alumina

| No. | Average particle size (μm) | Parts by weight |
|---|---|---|
| Ex. 4 | 0.20 | 14 |
| Ex. 5 | 0.25 | 14 |
| Ex. 6 | 0.20 | 10 |
| Comp. Ex. 4 | 0.20 | 6 |
| Comp. Ex. 5 | 0.20 | 20 |
| Comp. Ex. 6 | 0.20 | 14 |
| Comp. Ex. 7 | 0.40 | 14 |

To Composition 4 described in the following table, Composition 5 was added immediately before coating to prepare a coating solution for a backcoat layer.

TABLE 4

Formulation of Compositions 4 and 5 for preparation of backcoat layer

| Constituent | Parts by weight |
|---|---|
| Composition 4: | |
| Carbon black (BP800; made by Cabot Corp.) | 95 |
| Carbon black (MTCI; made by Cancarb Ltd.) | 5 |
| α-alumina (average particle size 0.25 μm) | 0.1 |
| Barium stearate (BFI; SAKAI CHEMICAL INDUSTRY CO., LTD.) | 0.1 |
| Butoxyethyl stearate | 0.5 |
| Copper oleate | 0.1 |
| Vinyl chloride copolymer (MR110; made by Nippon Zeon Co., Ltd.) | 50 |
| Urethane resin (UR8300; made by TOYOBO CO., LTD.) | 40 |
| Cyclohexanone | 200 |
| Methyl ethyl ketone | 300 |
| Composition 5: | |
| Polyisocyanate (Colonate 3041; made by Nippon Polyurethane Industry Co., Ltd.) | 20 |
| Toluene | 200 |
| Methyl ethyl ketone | 3500 |
| Silicon compound (KF69; made by Shin-Etsu Chemical Co., Ltd.) | 0.1 |

The constituents listed in the following table were mixed together to prepare a coating solution for an undercoat layer.

TABLE 5

Formulation of coating solution for undercoat layer

| Constituent | Parts by weight |
|---|---|
| Solvent-soluble polyester (1) (STAFIX; made by Fuji Photo Film Co., Ltd.) | 7 |
| Solvent-soluble polyester (2) (Vylon #300; made by TOYOBO CO., LTD.) | 3 |
| Methyl ethyl ketone | 495 |
| Toluene | 495 |

Onto a 9.8 μm thick polyethylene terephthalate support, the coating solution for an undercoat layer was coated in a dry coating amount of 8 mg/m², and then dried. Onto the undercoat layer, the coating solution for a magnetic layer was coated to a dry thickness of 3 μm. Before the coating solution for the magnetic layer became dry, its magnetic field was oriented using a 3,000 G cobalt magnet and a 3,000 G solenoid. After the magnetic layer dried, the coating solution for a backcoat layer was coated on the side opposite to the magnetic layer to a dry thickness of 0.6 μm.

After the backcoat layer dried, the composite was calendered by means of a 7-stage calender composed of metallic rolls and elastic rollers under the conditions 90° C., a linear pressure of 260 kg/cm and a speed of 80 m/min. Then, the calendered composite was heated for 48 hours at 70° C. to cure the polyisocyanate compound, whereafter the composite was slitted to a ½ inch width.

A lapping tape (K10000; made by Fuji Photo Film Co., Ltd.) was contacted with the resulting magnetic tape so as to overlap its magnetic layer. With a sapphire blade in touch with the back of the lapping tape, the magnetic tape and the lapping tape were caused to run in opposite directions to perform burnishing (relative speed between the magnetic tape and the abrasive tape: 7 m/sec). Then, a nonwoven fabric (WRP736; made by KURARAY CO., LTD.) was used to wipe the magnetic tape. For the magnetic tape of Comparative Example 7, neither burnishing nor wiping was performed.

<Evaluation of electromagnetic characteristics and durability>

The magnetic tapes of Examples 1 to 6 and Comparative Examples 1 to 7 prepared by the above-described method were each measured for the Al/Fe intensity ratio of the magnetic layer surface, the initial output, the output decrease after running for 50 passes, and the head wear in accordance with the methods described below.

The intensity ratio was measured by ESCA (Electron Spectroscopy for Chemical Analysis). In detail, the magnetic layer surface of the magnetic tape was irradiated with X rays by use of an Mg anode as an X ray source under the conditions 300 W, 15 kV and 100 eV, and the area intensity ratio between the 2s peak of Al and the $2s^{3/2}$ peak of Fe (Al/Fe) was determined by means of a photoelectron energy measuring instrument (phi-560; made by Φ Co.).

The initial output was measured by recording 32.5 MHz signals onto the magnetic tape by means of a digital β cam VTR (DVW500; made by SONY CORP.), and measuring output during reproduction by use of an oscilloscope. The results were expressed as relative values when the reproduction output of a digital β cam tape (D321; made by Fuji Photo Film Co., Ltd.) was set at 0 dB. The magnetic tape was evaluated as good (◯) when its relative reproduction output was 0.5 dB or more, and poor (X) when its relative reproduction output was less than 0.5 dB.

The output decrease after running for 50 passes was determined by measuring the output, which was obtained after repeating recording and reproduction for 50 passes in an environment of 40° C. and humidity of 20%, by the same method as described for the initial output, and calculating the decrease from the initial output to the measured output. The magnetic tape was evaluated as good (◯) when it had an output decrease of 2.0 dB or less, and poor (X) when it had an output decrease of more than 2.0 dB.

The head wear was determined by measuring the wear of the head after the magnetic tape was caused to run for a period corresponding to 100 hours in an environment of 23° C. and humidity of 50% with the use of a digital β cam VTR (DVW500; made by SONY CORP.). The magnetic tape was evaluated as good (◯) when the head wear was 1.5 μm or less, and poor (X) when the head wear was more than 1.5 μm.

TABLE 6

Intensity ratio and test results of each magnetic tape

| No. | Intensity ratio (Al/Fe) | | Initial output (dB) | | Output decrease (dB) | | Head wear (μm) |
|---|---|---|---|---|---|---|---|
| Comp. Ex. 1 | 0.271 | o | 1.3 | o | 0.3 | x | 2.5 |
| Comp. Ex. 2 | 0.270 | o | 1.2 | o | 1.2 | x | 2.9 |
| Comp. Ex. 3 | 0.260 | o | 1.0 | o | 0.5 | x | 2.2 |
| Ex. 1 | 0.245 | o | 1.5 | o | 0.3 | o | 1.4 |
| Ex. 2 | 0.205 | o | 1.0 | o | 0.5 | o | 1.3 |
| Ex. 3 | 0.185 | o | 1.0 | o | 1.0 | o | 0.7 |
| Ex. 4 | 0.178 | o | 0.8 | o | 1.9 | o | 1.0 |
| Ex. 5 | 0.165 | o | 0.7 | o | 1.8 | o | 1.2 |
| Ex. 6 | 0.155 | o | 1.2 | o | 2.0 | o | 0.8 |
| Comp. Ex. 4 | 0.145 | o | 1.0 | x | 4.5 | o | 0.9 |
| Comp. Ex. 5 | 0.145 | x | 0.3 | x | 3.5 | x | 1.8 |
| Comp. Ex. 6 | 0.131 | o | 0.8 | x | 5.0 | o | 0.8 |
| Comp. Ex. 7 | 0.125 | x | 0.4 | x | 4.0 | x | 1.9 |

The results in the above table show that the use of the magnetic tapes having an Al/Fe intensity ratio in the range of from 0.15 to 0.25 gave fully satisfactory results in all of the initial output test, the test for the output decrease after 50 passes of running, and the head wear test. On the other hand, the magnetic tapes with an Al/Fe intensity ratio of less than 0.15 underwent marked decreases in output, and their results in the initial output test and the head wear test were not entirely satisfactory. The magnetic tape shaving an Al/Fe intensity ratio in excess of 0.25 were found unavailable for practical use, because they wore the head excessively.

The magnetic tape of the invention that has an Al/Fe intensity ratio of the magnetic layer surface, as measured by ESCA, of from 0.15 to 0.25 is very suitable for use with a magnetic recording/reproduction system having a relative speed of 15 m/s or more between a tape and a head for recording and reproducing the tape. That is, the magnetic tape of the invention exhibits sufficient output and durability under high recording density, high transfer speed conditions. Thus, it can maintain satisfactory electromagnetic characteristics for along term, and shows a moderate head cleaning action. In these respects, the magnetic tape of the invention is very useful.

What is claimed is:

1. A magnetic tape for use in a magnetic recording/reproduction system having a relative speed of 15 m/s or more between a tape and a head for recording and reproducing the tape; said magnetic tape having at least one magnetic layer provided on a nonmagnetic support, said magnetic layer comprising an Al-containing ferromagnetic powder and alumina dispersed in a binder, and a backcoat layer provided on the surface of said nonmagnetic support opposite to said magnetic layer, wherein the intensity ratio between Al and Fe (Al/Fe), as measured by ESCA, in the surface of the magnetic layer is 0.15 to 0.25.

2. The magnetic tape according to claim 1, wherein the Al content of the ferromagnetic powder is 6 to 13 atomic % based on Fe.

3. The magnetic tape according to claim 2, wherein the Al content of the ferromagnetic powder is 7 to 12 atomic % based on Fe.

4. The magnetic tape according to claim 3, wherein the Al content of the ferromagnetic powder is 8 to 11.5 atomic % based on Fe.

5. The magnetic tape according to claim 1, wherein the content of a rare earth element in the ferromagnetic powder is 1.0 to 10 atomic % based on Fe.

6. The magnetic tape according to claim 1, wherein the σs of the ferromagnetic powder is 110 to 160 emu/g.

7. The magnetic tape according to claim 1, wherein the average major axis length of the ferromagnetic powder is 0.06 to 0.2 μm.

8. The magnetic tape according to claim 1, wherein the crystallite size of the ferromagnetic powder is 100 to 250 angstroms.

9. The magnetic tape according to claim 1, wherein the average particle size of the alumina is 0.05 to 0.5 μm.

10. The magnetic tape according to claim 9, wherein the average particle size of the alumina is 0.1 to 0.3 μm.

11. The magnetic tape according to claim 1, wherein the alumina is used in an amount of 6 to 20 parts by weight per 100 parts by weight of the ferromagnetic powder.

12. The magnetic tape according to claim 11, wherein the alumina is used in an amount of 9 to 16 parts by weight per 100 parts by weight of the ferromagnetic powder.

13. The magnetic tape according to claim 1, wherein carbon black is contained in the magnetic layer.

14. The magnetic tape according to claim 13, wherein the average particle size of the carbon black is 20 to 100 nm.

15. The magnetic tape according to claim 1, which has two or more of the magnetic layers.

16. The magnetic tape according to claim 1, which has a nonmagnetic layer between the magnetic layer and the support.

17. The magnetic tape according to claim 16, wherein the thickness of the magnetic layer is 0.1 to 0.8 μm.

18. The magnetic tape according to claim 1, which has an undercoat layer between the support and the magnetic layer.

19. The magnetic tape according to claim 1, wherein the thickness of the backcoat layer is 0.1 to 2 μm.

20. The magnetic tape according to claim 1, which has been produced by performing burnishing after preparation of the magnetic layer.

* * * * *